Patented Feb. 14, 1950

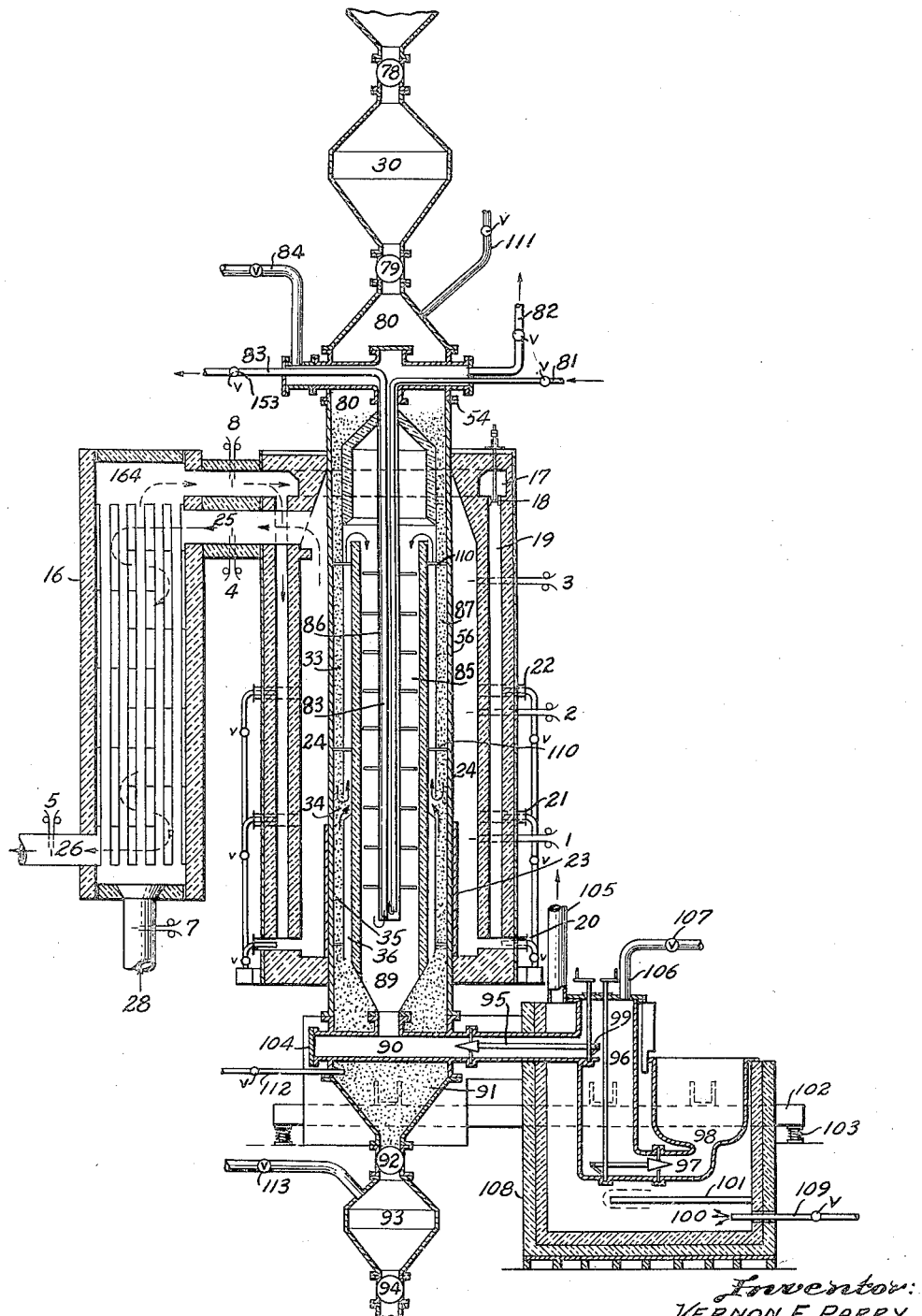

2,497,096

UNITED STATES PATENT OFFICE 2,497,096

PROCESS FOR THE PRODUCTION OF VAPORIZABLE METALS

Vernon F. Parry, Golden, Colo.

Original application April 20, 1945, Serial No. 589,450. Divided and this application October 7, 1946, Serial No. 701,635

4 Claims. (Cl. 75—67)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to chemical reaction methods, and more particularly to suitable methods for carrying out endothermic chemical reactions involving solid and gaseous or vaporous materials.

This invention accordingly has for its object the provision of a method for continuously carrying out endothermic chemical reactions involving a solid material having gas forming and liquefiable constituents and a gaseous substance. Further objects relate to the reduction of metallic ores such as those of iron, magnesium, zinc, and similar ores. Other objects of the invention will be apparent or will appear as the ensuing description proceeds.

In accordance with this invention an endothermic chemical reaction process involving a solid material and a gaseous or vaporous substance is carried out by passing said material through a stage heated annular reaction zone while withdrawing gaseous reaction products from a heat exchange zone enveloped by said reaction zone. It has been found that stage heated annular reaction zones provide superior means for carrying out endothermic chemical reactions between solids and gases or vapors, since heat can be supplied to the reactants with very high efficiency in heat resisting metallic vessels, and by utilizing the interior of an annular reaction zone as a heat exchange zone for withdrawing gaseous or vaporous products, increased efficiency can be obtained.

This invention also contemplates carrying out an endothermic chemical reaction involving gaseous and solid materials by passing said materials concurrently downward through an externally-heated vertically ranging elongated annular reaction zone, withdrawing gaseous products from said reaction zone near the zone of maximum reaction temperature and discharging said gaseous products upwardly while maintaining them in indirect heat exchange relation to said descending reactants, then discharging spent solids from a lower annular reaction zone counter-currently to ascending gases, while maintaining said lower annular reaction zone in indirect heat exchange relation with incoming gaseous or vaporous reactants. By providing two annular reaction zones as described, the entering solid and gaseous materials are preheated while recovering heat from exhausted gaseous products, and after attaining a maximum reaction temperature, the solid reactants are further passed in heat exchange relation to additional incoming gaseous or vaporous reactants or carrier gases as the case may be.

In the following description, it should be understood that the term "gaseous" includes materials which are vapors at the temperatures encountered, such as for example, steam, oil vapors, and similar materials. Furthermore the terms non-caking, non-agglomerating, or non-coking are associated with and define a material that does not swell or fuse to destroy its ability to move by gravity as a relatively free-flowing material.

In order to accomplish the high conversion efficiency, ranging from 60 to 75 percent or higher, the heat saving devices and the counter-current heat exchange principles outlined herein have been invented.

In the accompanying drawings:

The drawing is a sectional view, partly diagrammatic showing the apparatus suitably modified to provide for the continuous reduction of metallic ores wherein the reduced metal is vaporizable at the temperature of reduction and is recoverable through a suitable internal condenser.

Process for continuous reduction of magnesium and other ores

The heat exchanging annular reaction zone principle can also be applied to reactions requiring sub-atmospheric or super-atmospheric pressures, and the usual range of pressures is limited only by the strength of available construction materials. By the provision of suitable pressure-equalizing inlet and outlet devices, as particularly shown in the drawing, this invention can readily be adapted to a wide variety of gas-solid reactions such as the reduction of zinc ores, the recovery of mercury from cinnabar and the like, and particularly to the continuous production of magnesium from suitable magnesium ores and a suitable reducing agent; for example, the reduction of magnesite or dolomite with ferrosilicon. Referring to the drawings, an annular reaction device as previously described is provided with a suitable pressure equalizing inlet device which may take the form of a closed hopper 30, as shown in Figure 15, provided with a gas sealing hopper inlet valve 78 and a reaction tube inlet valve 79 located between the hopper 30 and the pre-heat zone 80 of the reaction tube or housing 56. This inlet pressure equalizing device provides a means for passing solid materials from atmospheric pressure through the hopper inlet valve 78 into the inlet hopper 30. After a suitable batch has accumulated in the inlet hopper 30, the inlet valve 78 is closed, and the pressure equalizing valve 79 is slowly opened so that the pressure in the hopper 30 and in the preheating zone 80 is equalized and the solid feed then proceeds by gravity into the housing 56.

The interior space of the annular reaction zone is suitably modified to provide a suitable device capable of exhausting gaseous products and having the additional function of heating or cooling vaporous products of reaction. As shown, a suitable device comprises an axially positioned vertical tubular member 86 provided with vertical spaced horizontal condensing fins 85 and having an inner concentrically placed exhausting pipe 83 for removing gaseous products or carrier gases. The exhausting pipe 83 may be provided with a suitable control valve 153, which is preferably placed outside the elongated housing 56 for ready access. The condensing tube 86 may also be provided with means for heating or cooling the same, and as shown, such means may take the form of a cooling medium inlet pipe 81 axially placed within the condensing tube 86 and extending to the lower portion thereof, and a cooling medium outlet 82 located near the upper portion of the condenser tube 86 and connecting therewith. A control valve 84 optionally may be provided to control the pressure existing in the condensing tube 86. Preferably, the condenser fins 85 are enclosed in a vertically positioned annular insulating baffle of suitable material to insulate the condensing zone defined by the condensing tube 86 and fins 85 from the heat of the annular reaction zone 33.

At the lower end of the elongated vessel 56 is a pressure-equalizing discharge device for removing spent solid materials passing through the apparatus. Such a discharge device may take the form of a receiver 93 provided with a discharge valve and an outlet valve 94. The receiver 93 may also be provided with a pressure equalizing valve 113 communicating with the atmosphere for gradually bringing the pressure in the receiver 93 to atmosphere. The solids discharge device may be operated by closing valves 94 and 113 and opening valve 92 to fill the receiver 93 with solids at the same pressure as exists in the reaction zone 33. Thereupon the valve 92 is closed and the pressure equalizing valve 113 is gradually opened to bring the contents of the receiver 93 to atmospheric pressure. The discharge valve 94 may then be opened and the spent solids discharged at atmospheric pressure from the receiver 93.

Suitable means are provided for continuously discharging liquid condensate, such as metallic liquid magnesium, mercury, zinc, and the like, from the condensing zone 89 in the vessel 56. As shown, suitable condensate discharging means may take the form of a horizontal off-take pipe 90 suitably closed at one end by a cap 104, and communicating with a skimming pot 98 through a pressure equalizing lock system 96. The entire skimming pot 98 and lock system 96 is suitably supported in a refractory setting 108 heated by an auxiliary burner 109 in the lower portion thereof. The pressure equalizing lock system 96 comprises a plug valve 95, suitably positioned in the offtake pipe 90, and actuated by remote means such as a hand-controlled cam 99. By opening the plug valve 95 the liquid magnesium or other molten condensate proceeds from the condensing zone through the pipe 90 and valve 95 into the lock system 96. The molten magnesium is retained in the lock system 96 by a suitable valve 97 in the lower portion thereof communicating with the skimming pot 98. A pressure equalizing valve 107 is provided on the top of the lock 96. As previously stated, the entire lock system and skimming pot are enveloped in combustion gases produced in the auxiliary burner 109. Optionally, the horizontal baffle 101 is positioned in the combustion chamber 100 to cause the combustion gases to follow a circuitous route around the skimming pot 98 and the lock chamber 96, whereby local overheating is inhibited. The combustion gases escape through a vent 105 on the upper portion of the combustion chamber 100. Desirably, the skimming pot and the lock chamber are supported by suitable resilient means permitting relative movement to compensate for expansion of the metallic parts of the device. Such supporting means may take the form of a supporting beam 102 which carries the mechanism and which is in turn supported by springs 103. In operating the lock chamber and skimming pot, liquid condensate proceeds from the condensing zone 89 in the elongated vessel 56 through the offtake pipe 90 and the valve 95 into the lock chamber 96, where it is retained by the lower valve 97. Thereupon, the valve 95 is closed, and the pressure equalizing valve 107 is gradually opened bringing the contents of the lock chamber 96 to atmospheric pressure. The valve 97 may then be opened to fill the pot 98 with molten liquid condensate, such as molten magnesium. Desirably, further purifying operations, such as fluxing and the like, may be carried out in the pot 98.

In carrying out the reduction of a suitable magnesium ore in accordance with this invention, the magnesium ore is comminuted to a relatively fine particle size and admixed with a suitable quantity of finely divided ferro-silicon. The resulting mixture is formed into balls or briquets having, for example, a size of one-half to three-quarters of an inch in diameter, and the briquetted mixture is then introduced into the inlet hopper 30 through the valve 78. The heat exchanging and condensing zone interior of the elongated vessel 56 is then exhausted or evacuated to a suitable pressure, say 1 mm. absolute, through the valve 153 by means not shown. The elongated vessel 56 is then heated to a suitable temperature of about 2100° F. by means of a suitable device for externally heating the vessel 56, such as for example, the device described in my parent application Serial Number 589,450 filed April 20, 1945. The valves 111, 95, 92, and 84 are closed, and the valve 79 is opened, to admit the charge into the preheating zone 80 and the annular reaction zone 32. As the reaction mixture proceeds downwardly through the annular reaction zone 33 by gravity, it is brought to a suitable temperature at which magnesium ores are reduced by ferrosilicon, and the liberated magnesium vapors pass concurrently through the annular reaction zone 33 and emerging into the heat exchange zone through the apertures 34, pass upwardly over the baffle 87 and thence downwardly into the condensing zone 85. The solid materials continue to fall downwardly by gravity into the lower reaction annulus 35 forming a continuation of the upper reaction annulus 33, where reduction of the solid material is completed, and the liberated vapors pass upwardly in counter-current relation to the descending solids. The spent ore is collected in the cooling zone 91 located in the lower portion of the elongated vessel 56 and is discharged through the solids discharge device previously described. The magnesium or other evolved vapors pass into the condensing zone 89 where they are condensed on the condensing pipe 86 and the condensing fins. The condensing pipe 86 and associated fins are maintained at a temperature below the temperature at which the vapor is condensed but above the temperature at which the condensate solidifies. A suitable temperature for magnesium is in the range of 800° to 650° C. at 1 mm. Hg. pressure. The temperature within the condensing tube is preferably regulated by circulating in the interior of the condensing tube 86 a suitable inert gas which may be admitted through the valve 81 and removed through the valve 82. Non-condensible vapor or gases are removed through the outlet tube 83 and the exhausting valve 153. The molten magnesium or other condensate falls by gravity from the condenser 86 and the fins through the condensing zone 89 and passes into the lock chamber 96 through the offtake pipe 90 and the valve 95. Upon accumulation of a suitable body of condensate in the lock chamber 96, the valve 95 is closed, and the charge is brought to atmospheric pressure by admitting a suitable inert gas through the valve 107, and the lock chamber 96 is then discharged through the outlet valve 97 into the pot 98. A suitable protective slag or flux is maintained on the surface of the molten metal or other condensate collected in the pot 98, to prevent oxidation of the contents thereof. The pot 98 and the lock chamber 96 are maintained at a temperature above the solidification point of the condensate but below the vaporization temperature thereof by means of the burner 109 and associated refractory setting 108.

In order to reinforce the elongated vessel 56 to enable it to withstand the extremely low vacuum employed in the reduction of magnesium ores, suitable stays 110 may be provided to strengthen the vessel at its weaker or more highly heated points and, as shown, they may be placed horizontally to connect the baffle 87 with the previously described heat exchange device and the vessel 56.

Optionally, in the reduction of magnesium ores employing the method and means of this invention, the inside of the vessel may be flooded with a suitable inert gas, for example, hydrogen, helium, argon, or other gas substantially inert to the magnesium or other metal being produced. This may be accomplished by introducing such an inert gas through a suitable valve 111 located in the upper portion of the vessel 56 as shown, and the inert gas may be withdrawn through exhausting valve 153. By this means, the partial pressure of the magnesium vapors or other reactive vapor in the interior of the apparatus may be lowered to such an extent as to approximate the usual partial pressure under high vacuum conditions.

It will be apparent from the foregoing description, there has been provided a method and means for carrying out reactions in a novel and desirable manner. A very excellent heat economy is secured by this invention. Heat transfer between an exterior source of heat, and a solid reactant is very greatly superior in my invention to any previously known device for accomplishing this purpose. Furthermore, the device is eminently suited to construction materials capable of withstanding the relatively high temperature often encountered in the endothermic reactions described, thus permitting a very long equipment life. For example, the reaction vessel and the heat interchange elements may be made of corrosion-resistant chrome-nickel steels, alone or provided with a protective coating of chromium, or the like. As the apparatus is susceptible of construction in generally circular or cylindrical shapes, the usual expansion problems normally encountered are largely or completely obviated.

This application is a division of my application, Serial No. 589,450, filed April 20, 1945.

Since many apparently widely differing embodiments of the invention will occur to one skilled in the art, various changes may be made in the method and means described and shown, without departing from the spirit and scope of this invention.

What is claimed is:

1. A process for the continuous production of a vaporizable metal from an ore thereof which comprises passing such an ore downwardly through an externally-heated elongated annular reaction zone, withdrawing and discharging spent ore near the bottom of said zone, withdrawing evolved vapors near the center of said zone into the interior thereof, passing said evolved vapors upwardly through an annular heat-exchange zone inside of and in heat-exchange relationship with said reaction zone, then passing said vapors downwardly into an elongated condensing zone inside of and in heat-exchanging relationship with said heat-exchanging zone, cooling and condensing metallic vapors to the liquid state in said condensing zone, and withdrawing and recovering liquid metal near the bottom of said condensing zone.

2. The process of claim 1 wherein cinnabar is the ore material and mercury is the produced metal.

3. The process of claim 1 wherein an oxidic ore of zinc together with a suitable reducing material, is employed to yield metallic zinc.

4. The process of claim 1 wherein magnesium oxide together with a suitable reducing agent is employed to yield metallic magnesium.

VERNON F. PARRY.

REFERENCES CITED

The following references are of record in the file of this patent:

UNITED STATES PATENTS

| Number | Name | Date |
|---|---|---|
| 669,410 | Guiterman | Mar. 5, 1901 |
| 1,961,424 | Maier | June 5, 1934 |
| 2,096,779 | Bartholomew et al. | Oct. 26, 1937 |
| 2,219,059 | Suchy et al. | Oct. 22, 1940 |
| 2,337,042 | Gloss | Dec. 21, 1943 |
| 2,362,718 | Pidgeon | Nov. 14, 1944 |